United States Patent Office 2,861,068
Patented Nov. 18, 1958

2,861,068

PREPARATION OF NITROGEN CONTAINING CELLULOSE DERIVATIVES

John Warren Mench and Brazelton Fulkerson, Rochester, N. Y., assignors to Eastman Kodak Company, Rochester, N. Y., a corporation of New Jersey No Drawing. Application November 1, 1956
Serial No. 619,681

8 Claims. (Cl. 260—227)

This invention relates to a process of preparing nitrogen containing cellulose derivatives by reacting chloroacyl esters of cellulose with secondary amines and to the products which are thus obtained.

Cellulose esters have been considered for many and various uses, but these uses are ordinarily limited to the solubility properties of the cellulose derivative. The need for cellulose derivatives which are insoluble in water, but soluble in organic solvents, and in dilute aqueous solutions of alkali has been satisfactorily solved by the preparation of the cellulose esters of dicarboxylic acids. However, there are specialized uses for cellulose derivatives which are insoluble in water, but are soluble in organic solvents and in dilute aqueous acids. Cellulose derivatives which exhibit these properties are not readily available at the present time.

Cellulose derivatives have been prepared having a nitrogen content therein, but those derivatives have not exhibited the desired solubility properties. Various difficulties have shown themselves in their preparation. For instance, cellulose esters of the amino carboxylic acids are difficult to prepare because of the relatively poor reactivity of those acids with cellulose. Carboxylic acids containing tertiary nitrogen atoms may be combined with cellulose or partially substituted cellulose esters, or ethers, by means of their anhydrides or by means of their acid chlorides. In either case, these methods suffer from the disadvantage that it is necessary to prepare and purify the desired acid. The isolation of the acid is usually difficult and accompanied by low yields. To prepare the anhydride or acid chloride from the acid requires an additional step. After these materials are prepared, ordinarily the use of a substantial amount of an organic base such as pyridine is necessary to promote the reaction thereof with cellulose material.

One object of our invention is to provide a process for preparing cellulose derivatives which are water insoluble but which are soluble in organic solvents and in dilute, aqueous acid solutions. Another object of our invention is to prepare nitrogen containing cellulose derivatives of good quality. A further object of our invention is to provide a method of imparting amine groups to cellulose compounds by reacting thereon with secondary amines. Other objects of our invention will appear herein.

We have found that by aminating certain cellulose ester or ether chloroacylates having an intrinsic viscosity of at least 0.2 and a combined chlorine content of at least 5% cellulose derivatives are obtained which are water insoluble, but are soluble in organic solvents and in dilute aqueous acid solutions. The amination of cellulose derivatives containing readily replaceable halogen atoms has been but little exploited in the field of cellulose chemistry. It has been found that under proper conditions this method is admirably suited for the preparation of highly substituted nitrogen-containing cellulose derivatives which are substantially free of chlorine.

The halogen-containing cellulose derivatives which have been found to be preferable for use are the cellulose acetate chloroacetates and the ethylcellulose chloroacetates. Other cellulose derivatives, however, containing acyl and chloroacetyl, chloropropionyl or similar groups, may be employed. The products which are reacted with the amine are prepared by any one of three methods to result in products having the desired intrinsic viscosity and the desired chlorine content. These methods are either (1) the reaction of chloroacetic anhydride upon a cellulose ester or cellulose ether containing substantial amounts of available hydroxyl, using a reaction solvent therein such as chloroacetic acid, 1,4-dioxane, acetone, methyl ethyl ketone or other solvents of a similar type, (2) by reacting upon a cellulose ester or ether containing available hydroxyl groups with chloroacetic acid in molten condition, or (3) by reacting upon a cellulose ester or ether with chloroacetic acid and acetic anhydride and a catalyst which exhibits basic properties in a non-aqueous aliphatic acid solution. Some catalysts of this type are sodium acetate, pyridine acetate, potassium acetate, trimethylamine acetate and the like. In the case of the second method, the temperature should be regulated so that the intrinsic viscosity of the cellulose ester is not reduced below 0.2. If a derivative containing as much as 10% chlorine is prepared, it is desirable in that method that the reaction temperature does not exceed 110° C. If, however, 8% chlorine is sufficient, the temperature can go to 120° C. or, in the case of 6% chlorine, to 140° C. By not exceeding these temperatures, a chlorine containing cellulose derivative is obtained having an intrinsic viscosity of at least 0.2 or, in other words, a product is finally obtained which is soluble in dilute aqueous acid.

In the case of reacting upon the cellulose derivative with chloroacetic anhydride or chloroacetic acid and acetic anhydride the reaction conditions are anhydrous and, hence, there is ordinarily no appreciable breakdown of chain-length.

The cellulose derivatives which are employed in the preparation of the halogen-containing cellulose derivatives may be any of the lower fatty acid esters of cellulose or the cellulose ethers which have available hydroxyl content therein. Some of the materials which may be used are, for example, cellulose acetate having an acetyl content within the range of 30–42%, cellulose acetate propionate or cellulose acetate butyrate which has been partially hydrolyzed or ethyl cellulose having available hydroxyl groups.

After the cellulose ester or cellulose ether has been chloroacylated to impart thereto a chlorine content of at least 5% under conditions whereby the intrinsic viscosity of the product obtained is at least 0.2 the chloroacylated cellulose material is then subjected to amination with a secondary amine by either a solution or a dispersion method in which at least two molar equivalents of secondary amine based on the chlorine content of the cellulose derivative is employed. In the solution method the dry cellulose chloroacylate derivative is dissolved in a solvent such as dioxane, acetone, methyl ethyl ketone or other solvent, and the amine is added thereto. In the dispersion method, the cellulose derivative is dispersed in a suitable liquid such as toluene and the secondary amine is incorporated therein. By using two moles of the secondary amine, there is supplied one mole thereof to replace the chlorine atom of the cellulose derivative and another mole to form amine hydrochloride which is insoluble in the reaction solvent thereby effectively removing the hydrochloric acid liberated. This facilitates the forcing of the amination reaction to completion, and prevents degradation of the cellulose compound by the liberated acid. Some secondary amines which have been found to be suitable for the formation of dilute acid-soluble cellulose derivatives include dimethylamine, diethylamine, di-n-propylamine, di-isopropylamine, di-n- butylamine, morpholine, piperidine and the like. Mixed secondary aliphatic amines may also be utilized. Cellulose derivatives may also be obtained using the higher aliphatic secondary amines and the aromatic amines or the mixed aromatic aliphatic amines, but the products which are obtained as a rule are not soluble in dilute aqueous acids.

The products formed are N,N-dialkylaminoacylates of cellulose esters or ethers which are readily soluble in dilute aqueous solutions of acids at a pH of 5.4 or lower provided that the nitrogen content is sufficiently high. With the specified chlorine content sufficient amine is imparted to the cellulose derivative that the nitrogen content is ample for acid solubility. For instance, in the case of cellulose acetate chloroacetates aminated with diethylamine, solubility in dilute acqueous acids is readily attained if the cellulose ester to be aminated has a combined chlorine content greater than about 5%.

The products prepared in accordance with our invention are especially useful in applications where water insolubility and solubility in organic solvents and in dilute aqueous acids is desired. These uses include films, filaments, sizing agents, stripping layers, anti-static layers, protective colloids and removable coatings such as anti-halation backing layers on photographic film. For instance, the nitrogen-containing cellulose derivative may be compounded with carbon black and used as a backing layer on film. These nitrogen-containing cellulose derivatives may be employed as antihalation backing layers using suitable dyes or carbon dispersions as light absorbers, as described in the Nadeau and Thompson application, Serial No. 545,644, filed November 8, 1955, now U. S. Patent No. 2,801,191.

Films or filaments may be prepared from the nitrogen-containing cellulose derivatives in accordance with our invention by casting or spinning from solutions of those derivatives in organic solvents or in weakly acidic aqueous solutions. For example, cellulose acetate N,N-diethylaminoacetate may be dissolved in water containing sulfur dioxide, 0.5% acetic acid, or any other combination of water and acid maintaining a pH below about 5.4. The solution thus obtained may be cast upon a coating surface and immediately gelled by immersing the uncured, wet sheet formed thereby in a dilute solution of a base, such as aqueous ammonia or sodium bicarbonate, which will raise the pH above 5.4. Curing of the thus gelled cellulose ester sheet may be accomplished rapidly by heating in a current of hot air.

The following examples illustrate the preparation of nitrogen-containing cellulose derivatives in accordance with our invention:

*Example 1*

One part of a cellulose acetate having a 32.2% acetyl content was dissolved in 3.7 parts of 1,4-dioxane and 2 parts of chloroacetic anhydride. After reacting these materials for 22 hours at steambath temperature (100° C.) the cellulose acetate chloroacetate which had formed was separated from the mass by dilution with acetone and precipitation into water. The material obtained was found to contain, after washing and drying, 9.3% of combined chlorine and 27.3% of combined acetyl. The intrinsic viscosity of the ester was 1.0.

This material was aminated by dissolving 1 part of the chloroacetate ester in five parts of 1,4-dioxane and adding 0.5 parts of diethylamine thereto. This is equivalent to about 2.5 moles of amine per mole of chlorine. The mass was refluxed for 7.5 hours, and the aminated derivative obtained was isolated by dilution with acetone and precipitation into water. The product was washed and dried and was found to contain 2.8% of nitrogen and less than 0.5% of chlorine. It exhibited solubility in acetone and in a wide variety of other organic solvents. It was also found to give good, clear solutions in dilute aqueous acids such as 0.5% aqueous acetic acid and the like providing the pH of these solutions was maintained at 5.4 or below. Aminations run in similar fashion utilizing dimethylamine, dipropylamine, piperidine, and morpholine gave products similar in characteristics to those described above. Aminations were also carried out using other solvents such as acetone and methyl ethyl ketone, and good reaction properties were exhibited.

*Example 2*

100 pounds of chloroacetic acid was melted in a glass-lined, jacketed reaction kettle with good agitation, and 50 pounds of a low-viscosity cellulose acetate containing 39.5% acetyl content was added thereto. The mass was heated with continuous stirring for 30 hours at a temperature of 95° C. The resulting mixture was cooled and diluted with 140 pounds of acetone. The product was separated from the mass by precipitation into distilled water. The product which was thoroughly washed and dried was found to contain 7.7% of combined chlorine. The intrinsic viscosity of the product was 0.52.

The cellulose acetate chloroacetate thus obtained was aminated by dissolving 45 pounds of the chloroacetate ester in 80 pounds of acetone and reacting with 25 pounds of diethylamine in a nickel autoclave. The reaction was run for 4 hours at 95° C. The mass was then diluted with 25 pounds of acetone and the product was isolated by precipitation into water. The product thus obtained was thoroughly washed and dried, and was found to contain 2.3% of combined nitrogen. The product gave clear solutions in many organic solvents and in dilute aqueous acids having a pH of not more than 5.4

*Example 3*

1 part of methyl cellulose containing 28% methoxyl (1.69 methoxyl groups per anhydroglucose unit) was dissolved in a mixture consisting of 1 part of chloroacetic acid, 2 parts of 1,4-dioxane and 2 parts of chloroacetic anhydride. After 7 hours reaction at steambath temperature the product was isolated by dilution of the reaction mixture with acetone and precipitation into water. The product was washed and dried and was found to contain 12.1% of combined chlorine (26.4% chloroacetyl). This material was aminated by dissolving 1 part thereof in a mixture of two parts of 1,4-dioxane and 0.75 parts of diethylamine and heating for 5.5 hours at 95° C. The product obtained was separated from the reaction mass in the same manner as in the preceding examples. It was found to contain 3.7% of combined nitrogen and to have an intrinsic viscosity measured in acetone solution of 0.85. The material was readily soluble in 0.5% acetic acid.

*Example 4*

1 part of ethyl cellulose containing 40% ethoxyl (1.94 ethoxyl groups per anhydroglucose unit) was dissolved in a mixture of 2 parts of 1,4-dioxane and 2 parts of chloroacetic anhydride. The mass was reacted for 5 hours at steambath temperature. The product was separated from the mass in the manner described in the preceding examples. The product obtained contained 10.8% of combined chlorine (23.6% chloroacetyl). One part of this product was aminated by dissolving in a mixture of 3 parts of 1,4-dioxane and 0.75 part of diethylamine and heated for five hours at 95° C. The product was separated from the mass as described in the preceding examples. It was found to contain 3.3% of combined nitrogen and had an intrinsic viscosity in acetone solution of 1.06. The product obtained was readily soluble in 0.5% aqueous acetic acid.

*Example 5*

1 part of cellulose acetate butyrate having 21.5% acetyl and 25.2% butyryl was dissolved in 2.5 parts of chloroacetic acid and the resulting mixture was heated for 4 days at 95° C. The cellulose acetate butyrate chloroacetate thus obtained was separated from the mass in the usual manner. This ester contained 12.3% of combined chlorine (26.9% chloroacetyl). This product was aminated by dissolving 1 part thereof in 1.75 parts of dioxane and 0.65 parts of diethylamine and heating for 4 hours at 95° C. After isolation in the usual manner, the product was found to contain 3.8% of combined nitrogen and had an intrinsic viscosity in acetone of 0.20. The product was readily soluble in 0.5% aqueous acetic acid.

*Example 6*

1 part of cellulose acetate having a 32% acetyl content was placed in a Werner-Pfleiderer mixer with 3 parts of chloroacetic acid and the mass was mixed at 165° F. until the acid melted and dissolved the cellulose acetate. 0.5 part of acetic anhydride and 0.5 part of sodium acetate were added and the mixer was run for 5 hours at 195° F.

The reaction mass was cooled to 155° F. and the cellulose acetate-chloroacetate formed was precipitated by adding water to the mixer while continuing the mixing. The ester was separated from the liquid and was treated with fresh water. The granular product obtained was ground to reduce it to 40-mesh size and was washed until acid-free. It was dried at 150° F. The cellulose acetate chloroacetate obtained had a chlorine content of 9.1%, 27% combined acetyl and an intrinsic viscosity in acetone of 0.92.

The cellulose ester was aminated by a procedure like that described in Example 1. The cellulose acetate diethylaminoacetate obtained was readily soluble in dilute aqueous acid.

We claim:

1. A method of preparing a product which is insoluble in and resistant to water but is soluble in organic solvents and in dilute aqueous acid solutions having a pH below 5.4 which comprises chloroacylating in a solution esterification procedure a cellulose derivative, selected from the group consisting of the lower fatty acid esters of cellulose, at least 1.8, but not all of the cellulose hydroxyls, per C6 unit of cellulose having been replaced by lower fatty acid radicals and the lower alkyl ethers of cellulose at least ½ but not all of the cellulose hydroxyls having been replaced by lower alkyl radicals, whereby a product is obtained having its chloroacyl groups attached only to the cellulose, a chlorine content of at least 5% and an intrinsic viscosity of at least 0.2 and reacting upon the chloroacylated cellulose derivative thus obtained with a secondary amine until substantially all of the combined chlorine content of the cellulose compound has been replaced by the group supplied by the amine.

2. A method of preparing a product which is insoluble in and resistant to water but soluble in organic solvents and in dilute aqueous acid solutions having a pH below 5.4 which comprises chloroacylating in a solution esterification procedure a cellulose derivative selected from the group consisting of the lower fatty acid esters of cellulose at least 1.8 but not all of the cellulose hydroxyls per C6 unit of cellulose having been replaced by lower fatty acid radicals and the lower alkyl ethers of cellulose at least ½ but not all of the cellulose hydroxyls having been replaced by lower alkyl radicals, with a reagent selected from the group consisting of chloroacetic acid and chloroacetic anhydride whereby a product is obtained having its chloroacyl groups attached only to the cellulose, a chlorine content of at least 5% and an intrinsic viscosity of at least 0.2 and reacting thereupon with a secondary amine until substantially all of the chlorine of the chloroacetyl cellulose derivative has been replaced by the group supplied by the amine.

3. A method of preparing a product which is insoluble in and resistant to water but soluble in organic solvents and in dilute aqueous acid solutions having a pH below 5.4 which comprises chloroacylating, in a solution esterification, a lower fatty acid ester of cellulose, at least 1.8 but not all of the cellulose hydroxyls per C6 unit of cellulose having been replaced by lower fatty acid radicals whereby a product is obtained having its chloroacyl groups only on the cellulose, a chlorine content of at least 5% and an intrinsic viscosity of at least 0.2 and reacting thereupon with a secondary amine until substantially all of the chlorine of the chloroacylated cellulose ester has been replaced by the amine.

4. A method of preparing a product which is insoluble in and resistant to water but soluble in organic solvents and in dilute aqueous acid solutions having a pH below 5.4 which comprises chloroacylating, in a solution esterification, a lower alkyl cellulose at least ½ but not all of the cellulose hydroxyls having been replaced by lower alkyl radicals, whereby its chloroacyl is attached only to the cellulose, the chlorine content is at least 5% and the intrinsic viscosity is at least 0.2 and reacting thereupon with a secondary amine until substantially all of the combined chlorine content of the chloroacylated cellulose ether has been replaced by the group supplied by the amine.

5. A method of preparing a product insoluble in and resistant to water and soluble in organic solvents and in aqueous acids of a pH below 5.4 which comprises chloroacylating in a solution esterification cellulose acetate having an acetyl content within the range of 30–42% to form a chloroacylated cellulose acetate having the chloroacetyl only on the cellulose, a combined chlorine content of at least 5% and an intrinsic viscosity of at least 0.2 and aminating the chloroacylated cellulose acetate by reacting thereon with a secondary aliphatic amine for a time sufficient to replace all of the chlorine of the cellulose derivative with groups supplied by the amine.

6. A method of preparing a product insoluble in and resistant to water and soluble in organic solvents and in dilute aqueous acid solutions having a pH below 5.4 which comprises chloroacylating in a solution esterification cellulose acetate having an acetyl content within the range of 30–42% to form a cellulose acetate chloroacetic in which the chloroacyl groups are only on the cellulose, the combined chlorine content is at least 5% and intrinsic viscosity is at least 0.2 and reacting thereupon with diethylamine for a time sufficient to replace all of the chlorine of the cellulose ester with diethylamine groups.

7. A method of preparing a product insoluble in and resistant to water but soluble in organic solvents and in dilute aqueous acid solutions having a pH below 5.4% which comprises chloroacylating cellulose acetate having an acetyl content within the range of 30–42% in dioxane solution with chloroacetic anhydride to form a cellulose acetate chloroacetate of which the chloroacetyl groups are attached only to the cellulose, the combined chlorine content is at least 5% and the intrinsic viscosity is at least 0.2 and reacting thereupon with a secondary aliphatic amine until substantially all of the combined chlorine content of the cellulose ester has been replaced by the group supplied by the amine.

8. A method of preparing a product insoluble in and resistant to water and soluble in organic solvents and in dilute aqueous acid solutions having a pH below 5.4 which comprises reacting upon a lower fatty acid ester of cellulose at least 1.8 but not all of the cellulose hydroxyl groups per C6 unit of cellulose having been replaced by lower fatty acid radicals with an esterification bath comprising chloroacetic acid, acetic anhydride, and a basic catalyst in an anhydrous aliphatic acid solution, the product obtained having its chloroacetyl attached only to the cellulose, a combined chlorine content of at least 5% and an intrinsic viscosity of at least 0.2 and reacting thereupon with a secondary amine until substantially all of the chlorine of the cellulose ester has been replaced by the group supplied by the amine.

(References on following page)

References Cited in the file of this patent

UNITED STATES PATENTS

| | | |
|---|---|---|
| 2,072,870 | Drefus | Mar. 9, 1937 |
| 2,136,296 | Hardy | Nov. 8, 1938 |
| 2,233,475 | Drefus | Mar. 4, 1941 |
| 2,512,960 | Morgan | June 27, 1950 |
| 2,518,203 | Thompson | Aug. 8, 1950 |

FOREIGN PATENTS

| | | |
|---|---|---|
| 344,480 | Great Britain | Mar. 2, 1931 |